UNITED STATES PATENT OFFICE.

HUGH M. THOMPSON, OF ST. LOUIS, MISSOURI.

IMPROVEMENT IN COMPOUNDS FOR FIRE-BRICKS.

Specification forming part of Letters Patent No. 162,123, dated April 13, 1875; application filed September 1, 1874.

*To all whom it may concern:*

Be it known that I, HUGH M. THOMPSON, of St. Louis, Missouri, have invented an Improved Compound for Fire-Bricks, &c., of which the following is a specification:

The object of this invention is to form an improved mixture, compound, or material for the making of fire-brick, fire-tiles, flues, pipes, furnaces, furnace-linings, crucibles, melting-pots, retorts, bath-bricks, and similar known articles of manufacture.

It is essential that a compound, or mixture, or material for the varied purposes above stated, shall possess in nature capabilities of resisting the effects of great heat; also possess strength, durability, compactness, &c.; also capable of resisting chemical action.

To form a compound, mixture, or material to possess the above required characteristics for the purposes specified, my invention consists in the use of white-rock, commonly called "tripoli," in its natural formation or state, in greater or less quantities, as may be required, in the perfect manufacture of any or all the above-enumerated articles, in combination with fire-clay, or plumbago, or steatite, or asbestus, or coke, and in such relative proportions either singly, or with all of said last-named materials, as the nature of the articles of manufacture demands.

In order that the white-rock (tripoli) I use in carrying out my invention may be determined, I herewith give the following analysis of a specimen. In composition said tripoli is silica, 98.57; water, .97; peroxide of iron, .44; lime, none; magnesia, a trace.

To make and use my invention, I will now more fully describe its process of manufacture.

I take of tripoli in quantity as much as desired, and subject the same to the well-known process of manufacturing and burning brick.

By this means I form a fire-brick or ware simply of tripoli, possessing the advantage of being in nature capable of resisting the greatest intensity of heat, more so than any other fire-brick of whatever material made and known to the art or manufacture.

Instead of exclusively using tripoli, as aforesaid, and for the varied purposes of manufacture, I combine with tripoli ordinary fire-clay, or steatite, or plumbago, or asbestus, or coke. The proportion of the tripoli used and the proportions of any of the materials as admixture named, depends, and is varied according to, the requirement of the particular article of manufacture to be made. Thus I find that by increasing the part or quantity of tripoli, the greater the element or characteristic for the made article to resist great heat is achieved. By increasing the quantity of fire-clay, the further elements and characteristics of the article made to resist great pressure, and to combine great strength, &c., is obtained. The admixture, therefore, of tripoli with fire-clay can be in equal parts, or as 1 to 2, or 2 to 1, &c.

Similarly the admixture of tripoli with any of the remaining above-named materials, can be likewise varied in parts or proportions. Thus, to overcome chemical actions, I form the article of manufacture to consist of the combination of tripoli either singly or with any or all of the materials or admixture stated.

The required admixture of tripoli with any or all of the materials named being determined by the particular object in view, the process of manufacture is accomplished by subjecting my compound, mixture, or combination material to the well-known process now used. This process can be stated to subject my invention to a grinding action to be reduced to a pulverized state; next mixed together in the required proportions, and passed through a pug-mill in either a dry or moist state; next the admixture is formed into blocks, and, finally, subjected to the chemical action of heat, as ordinary.

Having thus described my invention, what I claim is—

The combination of tripoli with either fire-clay, or plumbago, or steatite, or asbestus, or coke, or all of said-named ingredients, substantially as and for the purpose set forth.

In testimony of said invention I have hereunto set my hand.

HUGH M. THOMPSON.

Witnesses:
WILLIAM W. HERTHEL,
LEWIS W. POST.